United States Patent
Kim et al.

(10) Patent No.: US 9,507,419 B2
(45) Date of Patent: Nov. 29, 2016

(54) DISPLAY DEVICE GENERATING TACTILE FEEDBACK AND METHOD FOR CONTROLLING THE SAME

(71) Applicant: LG ELECTRONICS INC., Seoul (KR)

(72) Inventors: Yongsin Kim, Seoul (KR); Doyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 73 days.

(21) Appl. No.: 14/092,328

(22) Filed: Nov. 27, 2013

(65) Prior Publication Data

US 2015/0062024 A1  Mar. 5, 2015

(30) Foreign Application Priority Data

Sep. 2, 2013  (KR) .................... 10-2013-0104656

(51) Int. Cl.
*G06F 3/01*  (2006.01)
*G06F 3/0488*  (2013.01)

(52) U.S. Cl.
CPC ............. *G06F 3/016* (2013.01); *G06F 3/0488* (2013.01); *G06F 2203/04806* (2013.01)

(58) Field of Classification Search
CPC ...... G06F 3/016; G06F 3/0488; G06F 22/03; G06F 22/04806; G06F 2203/04806
See application file for complete search history.

(56) References Cited

U.S. PATENT DOCUMENTS

| | | | |
|---|---|---|---|
| 8,018,452 B1* | 9/2011 | Dow | 345/418 |
| 8,400,283 B2 | 3/2013 | Fadell et al. | |
| 8,405,627 B2 | 3/2013 | Karlsson | |
| 8,451,248 B1* | 5/2013 | Kim | 345/173 |
| 2003/0164861 A1* | 9/2003 | Barbanson | G06F 3/0481 715/815 |
| 2009/0066666 A1* | 3/2009 | Sagou | G06F 3/016 345/173 |
| 2009/0322498 A1 | 12/2009 | Yun et al. | |
| 2010/0156807 A1 | 6/2010 | Stallings et al. | |
| 2010/0231541 A1* | 9/2010 | Cruz-Hernandez et al. | 345/173 |
| 2010/0267424 A1* | 10/2010 | Kim et al. | 455/566 |
| 2011/0043662 A1 | 2/2011 | Kim | |
| 2011/0057886 A1* | 3/2011 | Ng et al. | 345/173 |
| 2011/0138275 A1* | 6/2011 | Yu | 715/702 |
| 2011/0187750 A1 | 8/2011 | Ko et al. | |
| 2012/0079390 A1* | 3/2012 | Ballagh et al. | 715/738 |
| 2014/0022216 A1 | 1/2014 | Nakamura | |

FOREIGN PATENT DOCUMENTS

WO  WO 2012/132802 A1  10/2012

* cited by examiner

*Primary Examiner* — Liliana Cerullo
(74) *Attorney, Agent, or Firm* — Birch, Stewart, Kolasch & Birch, LLP

(57) ABSTRACT

A method for controlling a display device according to an embodiment of the specification may include displaying a digital image including a first region to which a first tactile feedback is allocated, detecting a control input applied to the first region of the digital image, determining whether the first region of the digital image is smaller than a size threshold, zooming in on the first region to which the first tactile feedback is allocated to a size larger than the size threshold with a first magnification when the first region is smaller than the size threshold, and generating the first tactile feedback in the zoomed in on first region.

13 Claims, 9 Drawing Sheets

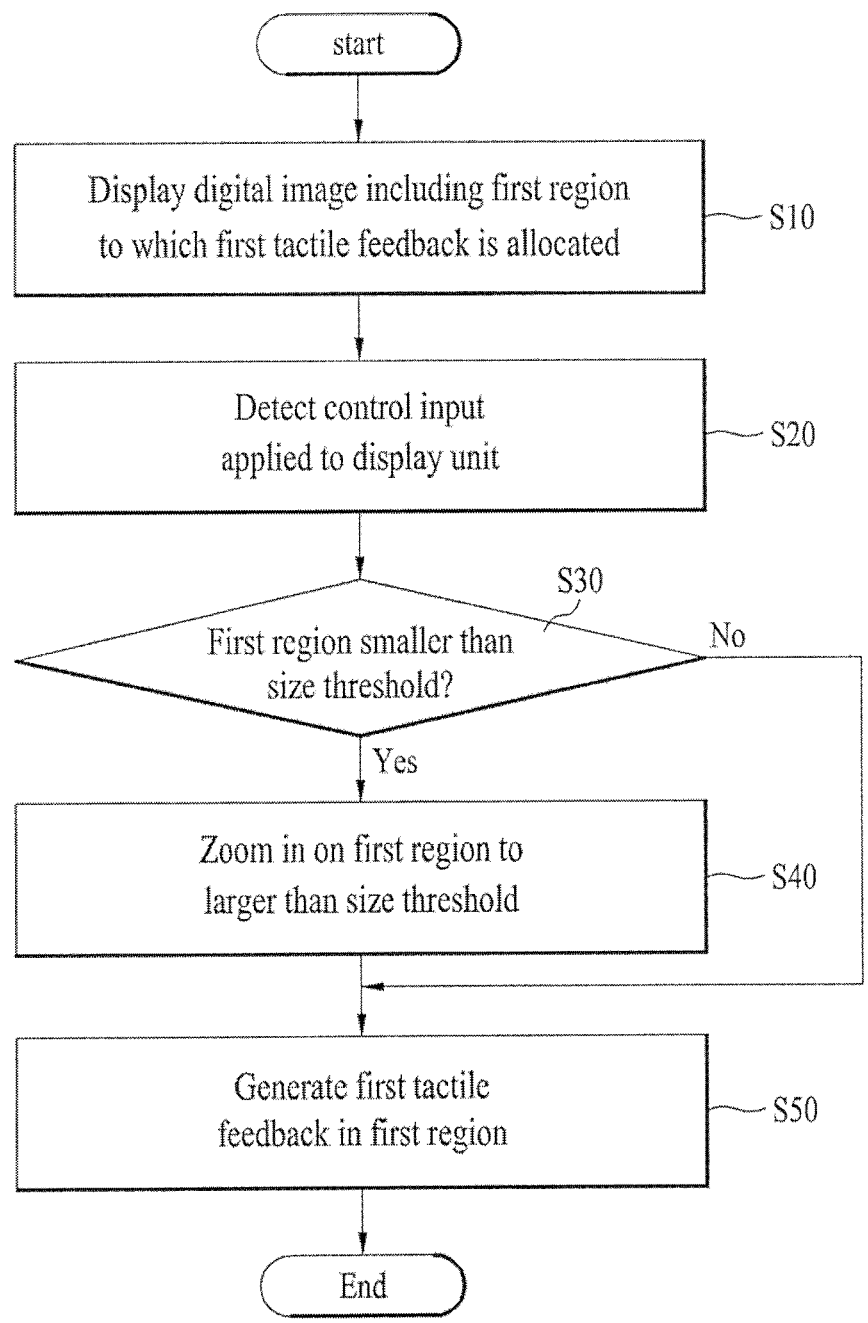

DISPLAY DEVICE GENERATING TACTILE FEEDBACK AND METHOD FOR CONTROLLING THE SAME

This application claims the benefit of Korean Patent Application 10-2013-0104656, filed on Sep. 2, 2013, which is hereby incorporated by reference as if fully set forth herein.

BACKGROUND OF THE INVENTION

Field of the Invention

The present specification relates to a display device and, more specifically, to a display device for zooming in on a digital image including tactile feedback.

Discussion of the Related Art

A user can control a touch sensitive display device by touching the surface of the display device. The touch sensitive display device can control an object in response to a touch input of the user and generate tactile feedback in a region within which the touch input is detected. Accordingly, the user can feel tactile sensation of the touched region.

However, when a plurality of tactile feedbacks is generated in a region touched by the user, the user cannot feel correct tactile feedbacks. Particularly, when a region generating tactile feedback is small, a user cannot correctly confirm the tactile feedback. Accordingly, a method for providing correct tactile feedback to a user is needed.

SUMMARY OF THE INVENTION

Accordingly, the present specification provides a display device for providing correct tactile feedback and a method for controlling the same. In the present specification, especially, the display device needs to provide a method for zooming in on a displayed digital image in response to a detected touch input.

A display device according to an embodiment of the present specification include a display unit configured to display a digital image, the digital image including a first region to which a first tactile feedback is allocated, a sensor unit configured to detect a control input applied to the display unit, a tactile feedback unit configured to generate the first tactile feedback in the first region, and a controller configured to control the display unit, the sensor unit and the tactile feedback unit, wherein the controller zooms in on the first region to which the first tactile feedback is allocated to a size larger than a size threshold with a first magnification when the first region is smaller than the size threshold upon detection of the control input and generates the first tactile feedback in the zoomed in on first region.

In another embodiment of the present specification, a method for controlling a display device includes displaying a digital image including a first region to which a first tactile feedback is allocated, detecting a control input applied to the first region of the digital image, determining whether the first region of the digital image is smaller than a size threshold, zooming in on the first region to which the first tactile feedback is allocated to a size larger than the size threshold with a first magnification when the first region is smaller than the size threshold, and generating the first tactile feedback in the zoomed in on first region.

In another embodiment of the present specification, a display device includes a display unit configured to display a digital image, the digital image being divided into a plurality of regions to which different tactile feedbacks are allocated, a sensor unit configured to detect a control input applied to the display unit, a tactile feedback unit configured to generate tactile feedback allocated to a touch region in which the touch input is detected, and a controller configured to control the display unit, the sensor unit and the tactile feedback unit, wherein the controller detects touch input applied to the display unit, compares the size of a first region to which a first tactile feedback is allocated with the size of a second region to which a second tactile feedback is allocated when the touch region in which the touch input is detected includes the first region and the second region, generates the first tactile feedback in the touch region when the first region is larger than the second region, and generates the second tactile feedback in the touch region when the first region is smaller than the second region.

According to the present specification, the display device can zoom in on a displayed digital image to provide correct tactile feedback.

According to the present specification, the display device can control zoom-in magnification on the basis of the area or size of a region within which a touch input is detected.

According to the present specification, the display device can determine whether or not zoom-in is performed or a zoom-in ratio according to the size of a region having tactile feedback.

According to the present specification, the display device can zoom in on a digital image such that a region smaller than a size threshold becomes larger than the size threshold when a tactile feedback mode is activated.

According to the present specification, the display device can partially zoom in on a digital image of a region having tactile feedback.

According to the present specification, the display device can generate tactile feedback in a region larger than a region having the tactile feedback.

BRIEF DESCRIPTION OF THE DRAWINGS

The accompanying drawings, which are included to provide a further understanding of the present specification and are incorporated in and constitute a part of this application, illustrate embodiment(s) of the present specification and together with the description serve to explain the principle of the specification. In the drawings:

FIG. 9 is a flowchart illustrating operation of the display device according to an embodiment of the present specification.

DETAILED DESCRIPTION OF THE INVENTION

The detailed description, which will be given below with reference to the accompanying drawings, is intended to explain exemplary embodiments, rather than to show the only embodiments that can be implemented.

Although the terms used in the present specification are selected from generally known and used terms, the terms may be changed according to the intention of an operator, customs, or the advent of new technology. Some of the terms mentioned in the description of the present specification have been selected by the applicant at his or her discretion, the detailed meanings of which are described in relevant parts of the description herein. Therefore, the present specification must be understood, not simply by the actual terms used but by the meanings of each term as used herein.

In the specification, a display device may be a device including a display unit. For example, the display device can include a smartphone, a smartpad, a notebook computer, a tablet PC, a music player, a smart table, a monitor, a remote controller or a television receiver.

Figure 1:
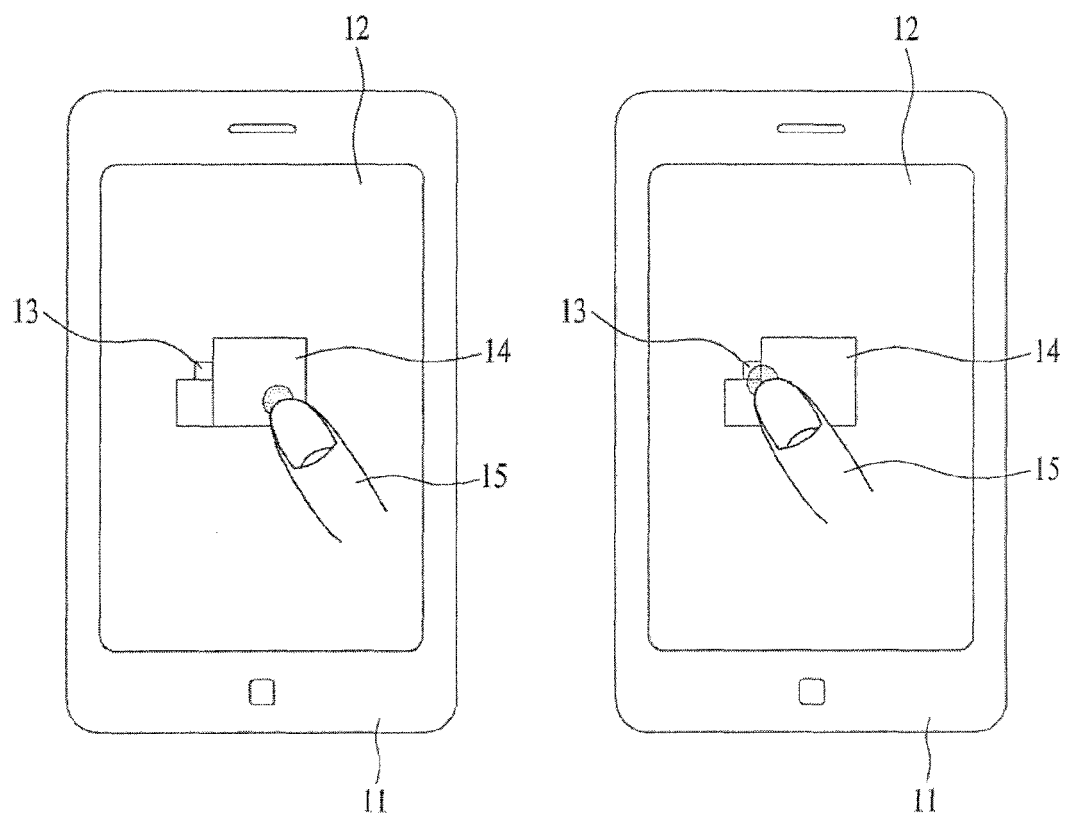
FIG. 1 illustrates a method for providing tactile feedback in response to a digital image of a display device according to an embodiment of the present specification.

FIG. 1 illustrates a method for providing tactile feedback in response to a digital image displayed by a display device 11 according to an embodiment of the specification. The display device 11 may include a display unit 12. The display device 11 may display a digital image using the display unit 12. The displayed digital image may be divided into a plurality of regions generating different forms of tactile feedback. That is, the display device 11 can define parts having the same tactile feedback in a closed curve as a region. Referring to the left of FIG. 1, the digital image may be divided into first and second regions 13 and 14. The display device 11 may generate tactile feedback in a single region. In the specification, a single form of tactile feedback can be defined as tactile feedback generated in a single region. Accordingly, the display device 11 can divide the displayed digital image into a plurality of regions each having tactile feedback.

For example, the display device 11 can generate a first tactile feedback in the displayed first region 13 and generate a second tactile feedback in the second region 14. That is, the display device 11 can generate the first tactile feedback in any part of the first region 13 to which the first tactile feedback is allocated. In addition, the display device 11 can generate the second tactile feedback in any part of the second region 14 to which the second tactile feedback is allocated. In other words, each region included in a digital image can be defined as a set of parts having the same feedback.

Referring to the left of FIG. 1, a control input 15 may be applied to the second region 14. Here, the control input 15 may include touch input, gesture input and input using an input device. The display device 11 may generate the second tactile feedback in the second region 14 in response to the control input 15. In the left of FIG. 1, the second region 14 displayed on the display unit 12 may be larger than a touch region corresponding to the control input 15. Accordingly, the display device 11 may generate the second tactile feedback in the touch region corresponding to the control input 15. A user can tactually confirm the second tactile feedback in the touch region corresponding to the control input 15. Accordingly, the display device 11 can correctly provide the second tactile feedback of the second region to the user. That is, the display device 11 can generate the second tactile feedback corresponding to tactile feedback of the second region.

Referring to the right of FIG. 1, the control input 15 may be applied to the first region 13. The display device 11 may generate the first tactile feedback in the first region 13 in response to the control input 15. In the right of FIG. 1, the first region 13 displayed on the display unit 12 may be smaller than the touch region of the control input 15. Accordingly, the touch region of the control input 15 may include not only the first region 13 but also the second region 14. The display device 11 may generate the first tactile feedback in the first region 13 and generate the second tactile feedback in the second region 14. Accordingly, the first tactile feedback can be generated in a part of the touch region of the control input 15 and the second tactile feedback can be generated in another part of the touch region. The user can tactually confirm the first tactile feedback in a part of the touch region corresponding to the control input 15 and tactually confirm the second tactile feedback in another part of the touch region. Accordingly, it is difficult for the display device 11 to provide correct tactile feedback of the first region to the user.

To provide correct tactile feedback to the user, the display device 11 may operate in the following manner. When the touch region includes the first region and the second region, the display device 11 may generate tactile feedback allocated to a larger region in the touch region. The display device 11 may detect the touch input 15 applied to the display unit 12. When a touch region from which the touch input is detected includes the first region to which the first tactile feedback is allocated and the second region to which the second tactile feedback is allocated, the display device 11 may compare the sizes of the first region 13 and second region 14 included in the touch region.

When the first region 13 is larger than the second region 14, the display device 11 can generate the first tactile feedback in the entire touch region. That is, when the touch region includes the first region and the second region, the display device 11 can generate tactile feedback allocated to a larger region in the touch region. When the first region is smaller than the second region, the display device 11 can generate the second tactile feedback in the entire touch region. Accordingly, the display device 11 can provide correct tactile feedback of a region touched by the user to the user. That is, the display device 11 can generate single tactile feedback in the touch region corresponding to the control input.

Figure 2:
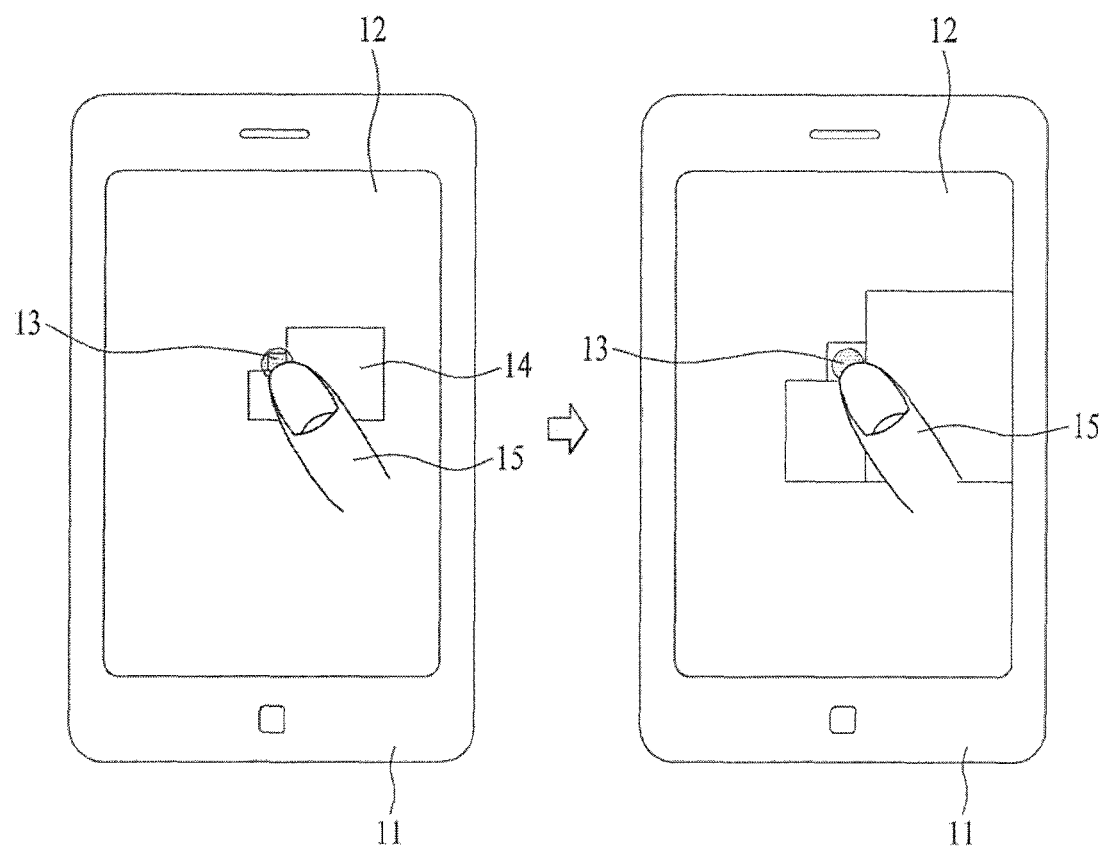
FIG. 2 illustrates a method for zooming in on a digital image including tactile feedback according to an embodiment of the present specification.

FIG. 2 illustrates a method for zooming in on a digital image including tactile feedback according to an embodiment of the specification. The display device may zoom in on a displayed digital image in order to provide correct tactile feedback to the user. The display device may determine zoom-in magnification in response to the touch region corresponding to the control input. Particularly, the display device can determine the zoom-in magnification in response to the size of the touch region corresponding to the control input. In addition, when a digital image displayed on the display device includes a plurality of regions each having tactile feedback, the display device 11 may determine a minimum magnification at which the tactile feedbacks respectively allocated to the plurality of regions included in the digital image are discriminated as a zoom-in magnification.

As shown in the left of FIG. 2, the display device 11 may display a digital image on the display unit 12. The digital image may include the first region 13 smaller than a size threshold of the control input 15. Here, the size threshold may be set based on the size of the touch region corresponding to the control input 15. For example, the display device can set the size of a region from which a touch input is detected as the size threshold. Accordingly, when the control input 15 is applied to the first region 13, the touch region corresponding to the control input 15 may include not only the first region 13 but also a neighboring region. In this case, the display device 11 may generate the first tactile feedback allocated to the first region 13 and another tactile feedback allocated to the neighboring region. Accordingly, the first tactile feedback and the other tactile feedback may be simultaneously generated in the touch region of the control input 15.

The display device 11 may zoom in on the digital image in order to selectively generate the first tactile feedback in the touch region of the control input 15. The display device 11 may zoom in on the digital image as shown in the right of FIG. 2. The display device 11 may zoom in on the first region 13 such that the first region 13 becomes larger than the size threshold.

The display device 11 may zoom in on the digital image in all directions from the region in which the control input 15 is detected. Accordingly, the user can tactually confirm the first tactile feedback allocated to the first region 13 of the zoomed digital image without moving the position of the control input 15.

If the control input 15 simultaneously touches the first region 13 and the second region adjacent thereto, the display device 11 may compare a first area corresponding to the area of the control input 15, detected in the first region, with a second area corresponding to the area of the control input 15, detected in the second region. When the first area is larger than the second area, the display device 11 can zoom in on the digital image including the first region and the second region on the basis of the first region. When the first area is smaller than the second area, the display device 11 can zoom in on the digital image including the first region and the second region on the basis of the second region.

The display device 11 may determine a zoom-in magnification of the digital image in order to selectively generate the first tactile feedback in the touch region of the control input 15. The display device 11 may determine the zoom-in magnification in response to the area of the touch region of the control input 15. According to another exemplary embodiment, the display device 11 may determine a magnification that allows the touch region to be included in the first region 13 as the zoom-in magnification.

Alternatively, the display device may determine a minimum magnification at which the first tactile feedback allocated to the first region of the digital image is discriminated from the second tactile feedback allocated to the second region adjacent to the first region as the zoom-in magnification.

The display device 11 may determine the zoom-in magnification such that the touch region of the control input 15 is included in a region having a single tactile feedback. The display device 11 may zoom in on the digital image with a first magnification such that the first region 13 includes the touch region of the control input 15. When the touch region of the control input 15 is included in the first region 13, the touch region may be a region in which tactile feedback is generated. That is, the display device 11 can zoom in on the digital image with the first magnification and generate the first tactile feedback in the region from which the control input 15 is detected. Accordingly, the display device 11 can correctly provide the first tactile feedback to the user.

In accordance with another exemplary embodiment, the display device 11 may zoom in on the digital image with the first magnification such that the first region 13 corresponding to an area greater than a predetermined percentage of the touch region of the control input 15 is included in the touch region of the control input 15. Accordingly, the display device 11 can generate the first tactile feedback in the part occupying the predetermined percentage of the touch region of the control input 15 or more and provide the correct first tactile feedback to the user.

As described above, the display device 11 can zoom in on the displayed digital image to locate a region having a single tactile feedback in the touch region in which the control input 15 is detected. Accordingly, the display device 11 can generate a single tactile feedback in the touch region in which a plurality of tactile feedbacks were generated and provide the correct tactile feedback to the user.

Figure 3:
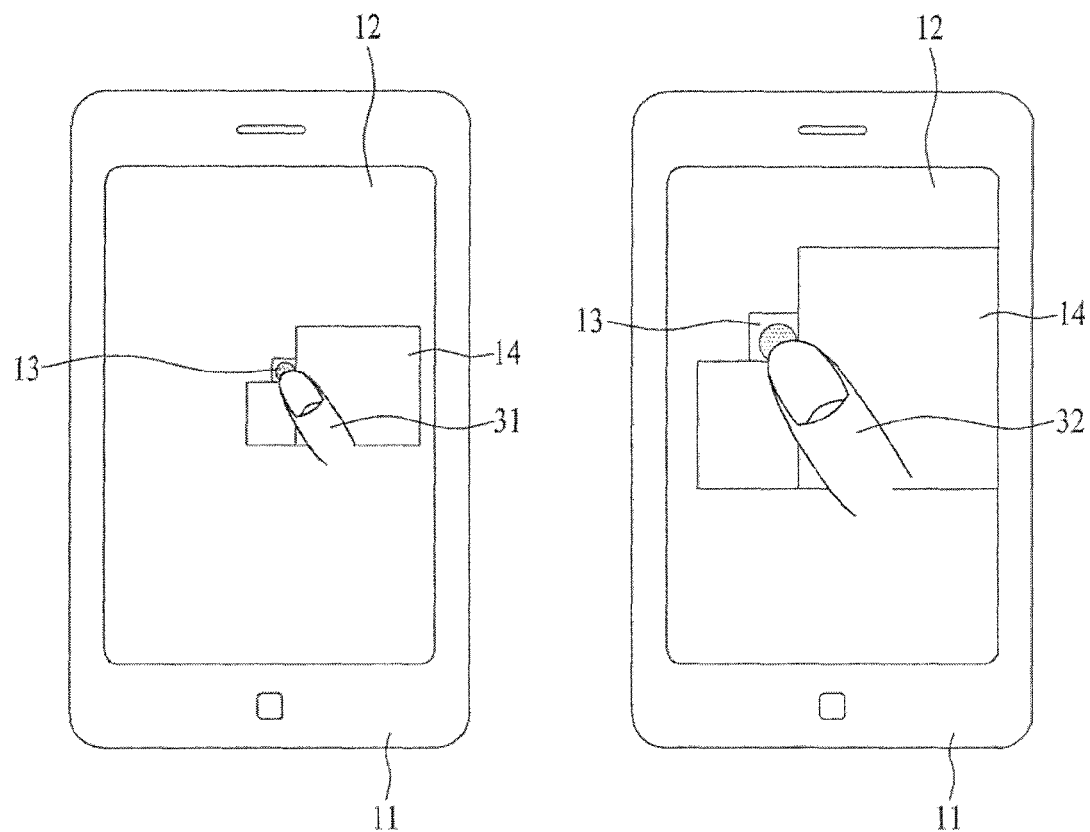
FIG. 3 illustrates a method for determining a zoom-in magnification in response to a touch area of the display device according to an embodiment of the present specification.

FIG. 3 illustrates a method for determining a zoom-in magnification in response to a touch area of the display device according to an embodiment of the specification. The touch region of the control input may depend on the user of the display device. For example, the size of the touch region of the control input may be varied according to the size of a user finger, the force of the finger touching the display device or the pattern of using the finger.

The display device 11 may discriminate and detect control input touch regions having different sizes. The display device 11 may adaptively determine a zoom-in magnification based on detected touch region sizes. When the size of the touch region of the control input corresponds to a first size, the display device 11 may zoom in on the digital image with the first magnification. When the size of the touch region of the control input corresponds to a second size, the display device 11 may zoom in on the digital image with a second magnification. If the second size is greater than the first size, the display device 11 may set the second magnification such that the second magnification is higher than the first magnification.

The left and right images of FIG. 3 respectively illustrate methods of determining a zoom-in magnification by the display device when a first control input 31 and a second control input 32 respectively having touch regions of different sizes are detected. Referring to the left of FIG. 3, the display device 11 may detect the first control input 31 having a touch region of a first size. The display device 11 may zoom in on the digital image with the first magnification such that the touch region having the first size is included in the first region 13. Here, the display device 11 can determine a minimum magnification that allows the first region 13 to include the touch region having the first size as the first magnification.

Alternatively, the display device 11 may set the size of the first region 13 zoomed in with the first magnification as the size threshold. The display device 11 may zoom in on the first region 13 to a larger extent than the size threshold. Accordingly, the display device 11 can generate a single tactile feedback for the first control input 31 corresponding to the touch region having the first size.

Referring to the right of FIG. 3, the display device 11 may detect the second control input 32 having a touch region of a second size. Here, the second size may exceed the first size. The display device 11 may detect the touch region of the second size when a user finger applying the second control input 32 is larger than a user finger applying the first control input 31. When the user finger applying the second control input 32 and the user finger applying the first control input 31 have the same size, the display device 11 may detect the touch region of the second size if touch pressure of the second control input 32 is greater than touch pressure of the first control input 31.

The display device 11 may zoom in on the digital image with the second magnification such that the touch region of the second size is included in the first region 13. Here, the display device 11 may determine a minimum magnification that allows the first region 13 to include the touch region of the second size as the second magnification. According to another exemplary embodiment, the display device 11 may set the size of the first region 13 zoomed in with the second magnification as the size threshold. The display device 11 may zoom in on the first region 13 to a size larger than the size threshold. Accordingly, the display device 11 can generate a single tactile feedback for the second control input 32 having the touch region of the second size.

Figure 4:
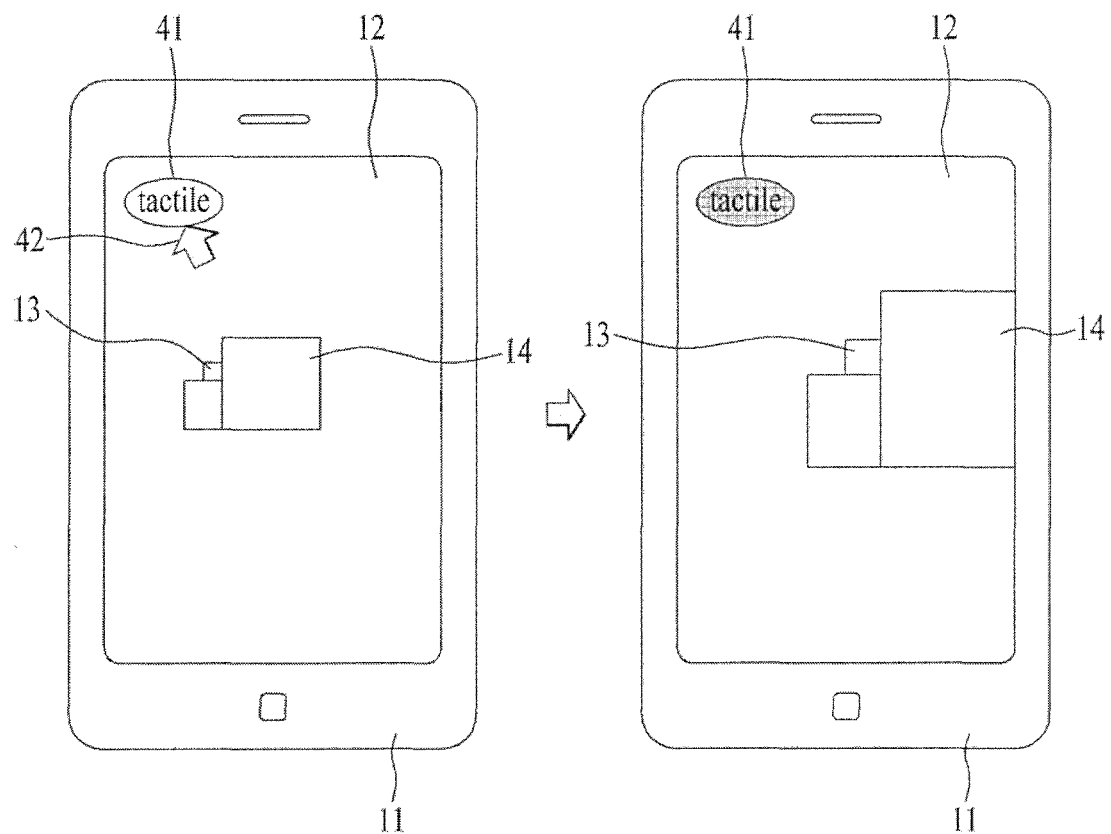
FIG. 4 illustrates a method for zooming in on a digital image in response to a tactile mode activation by the display device according to an embodiment of the present specification.

FIG. 4 illustrates a method for zooming in on a digital image by the display device in response to tactile mode activation according to an embodiment of the specification. The display device may operate in a visual mode or a tactile mode.

In the visual mode, the display device may display a digital image. The display device may not generate tactile feedback even when tactile feedback is allocated to each region of the digital image. The user may visually confirm the displayed digital image and cannot be provided with tactile feedback even when the user touches the display unit on which the digital image is displayed.

In the tactile mode, the display device may generate tactile feedback allocated to each region of the displayed digital image. The user can confirm the displayed digital image and touch the region in which the digital image is displayed to tactually confirm the tactile feedback.

The display device may zoom in on the displayed digital image with a predetermined zoom-in magnification upon activation of the tactile mode. Here, the predetermined zoom-in magnification may be a magnification that allows a region having tactile feedback according to zoom in to become larger than the size threshold. The display device may set a predetermined reference area as the size threshold. The display device may determine the average of areas of touch regions of control inputs as the reference area. In other words, the display device can determine the average of areas of touch regions on the basis of a plurality of control inputs for digital images including tactile feedback.

As shown in the left of FIG. 4, the display device 11 may display a digital image using the display unit 12 in the visual mode. The digital image may include the first region 13 and the second region 14 to which the first tactile feedback and the second tactile feedback are respectively allocated. The display device 11 may reserve the tactile feedback allocated to each region without generating the tactile feedback . . .

The display device 11 in the visual mode may display a soft button 41 to activate the tactile mode. The user may operate the soft button 41 using a touch input or a pointer 42. The display device 11 may switch from the visual mode to the tactile mode upon detection of a control input applied to the soft button 41 to activate the tactile mode. The display device 11 may change the image of the soft button 41 to use the soft button as an indicator for indicating that the display device 11 is in the tactile mode.

In the tactile mode, the display device 11 may zoom in on the displayed digital image with a zoom-in magnification. Here, the display device 11 may set a magnification that allows a region having a single tactile feedback according to zoom in to become larger than the size threshold as the zoom-in magnification. In the left of FIG. 4, the first region 13 from among regions included in the digital image is the smallest. Accordingly, the display device 11 can set a magnification at which the first region 13 becomes larger than the size threshold as the zoom-in magnification. That is, the display device 11 can set a magnification at which the smallest region becomes larger than the size threshold as the zoom-in magnification.

The display device 11 may zoom in on the digital image according to the determined zoom-in magnification and thus each region included in the digital image can be zoomed in to larger than the size threshold. According to another exemplary embodiment, the display device 11 may individually zoom in on each region included in the digital image with the determined zoom-in magnification. The display device 11 may zoom in on the first region 13 corresponding to the smallest region with the determined zoom-in magnification. The display device 11 may zoom in on another region included in the digital region, to which tactile feedback is allocated, according to the determined zoom-in magnification. That is, the digital device 11 can zoom in on the second region as well as the first region according to the set zoom-in magnification.

Accordingly, the user can tactually confirm tactile feedback allocated to each region by touching each region. The display device 11 may generate the first tactile feedback in the zoomed in on first region 13. That is, the display device 11 can correctly provide the first tactile feedback allocated to the first region to the user by displaying the first region in the visual mode and displaying the zoomed in on first region in the tactile mode.

Figure 5:
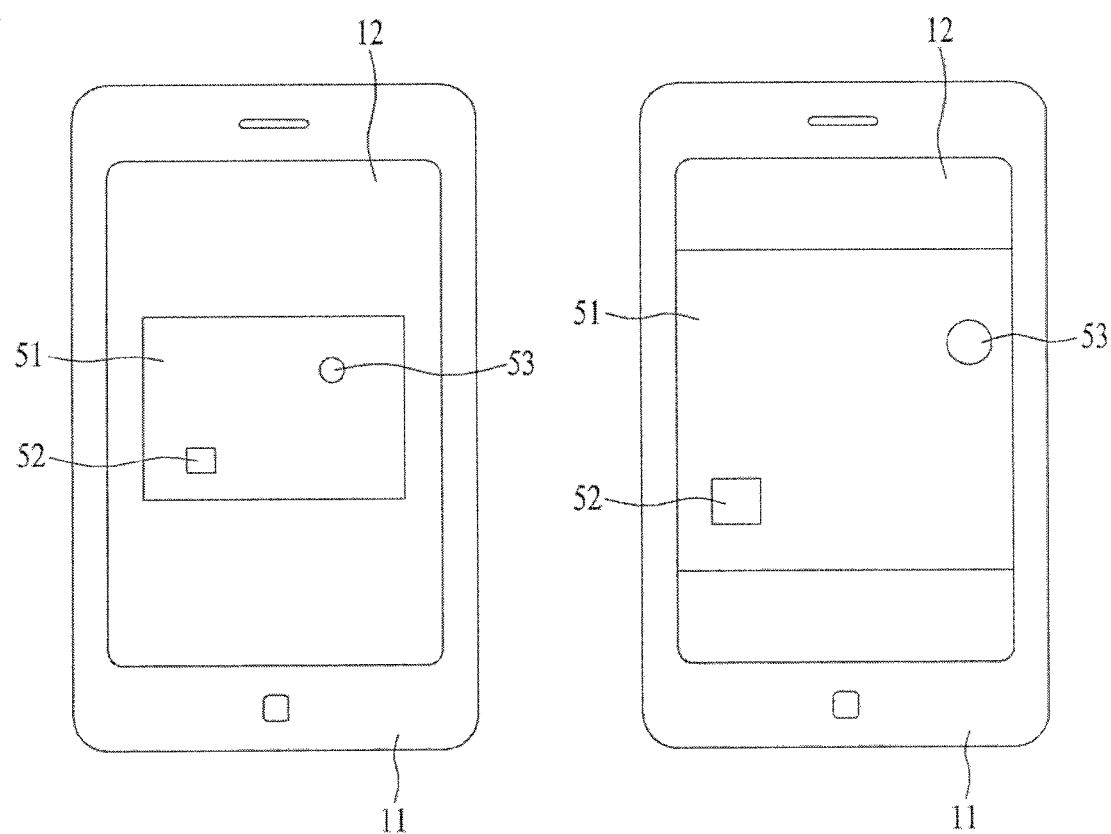
FIG. 5 illustrates a zoom-in magnification of the display device according to an embodiment of the present specification.

FIG. 5 illustrates a method for determining a zoom-in magnification of the display device according to an exemplary embodiment of the specification. The display device 11 may display a digital image. The display device 11 may provide correct tactile feedback to the user by zooming in on the digital image. The display device 11 may zoom in on the digital image according to a zoom-in magnification. The display device 11 may determine the zoom-in magnification as a maximum magnification that allows regions to which tactile feedbacks are allocated from among a plurality of regions included in the digital image to be displayed in a display area of the display unit.

Referring to the left of FIG. 5, the display device 11 may display a digital image 51 using the display unit 12. The digital image 51 may include a first region 52 to which a first tactile feedback is allocated and a second region 53 to which a second tactile feedback is allocated. The display device 11 may determine a zoom-in magnification based on the first region 52 and the second region 53 to which the first tactile feedback and the second tactile feedback are respectively allocated. Here, the zoom-in magnification may be defined as a magnification that allows the display device to zoom in on a digital image in order to provide a correct tactile feedback allocated to each region of the digital image to the user.

The display device 11 may set a maximum magnification that allows the first region 52 and the second region 53 included in the zoomed digital image 51 to be included in the display area of the display unit 12 as the zoom-in magnification. That is, the display device 11 can zoom in on the digital image within a range within which the first region 52 or second region 53 is not outside the display area.

The right of FIG. 5 shows the display device 11 displaying a zoomed digital image. The display device 11 may display the digital image 51 including the first region 52 and the second region 53 on the display unit 12. The display device 11 may display the first region 52 and the second region 53 zoomed in compared to the left of FIG. 5. Accordingly, the user can tactually confirm the first tactile feedback and the second tactile feedback by touching the zoomed first region 52 and second region 53.

Figure 6:
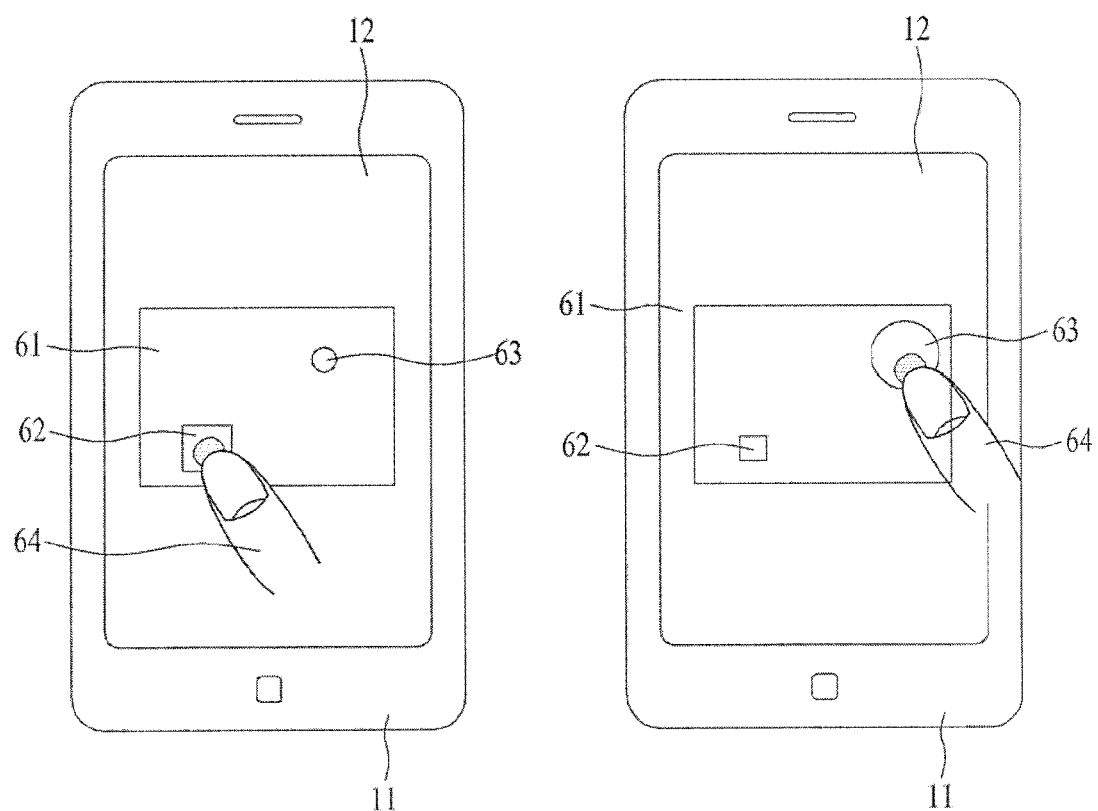
FIG. 6 illustrates a method for zooming in on each region of a digital image by the display device according to an embodiment of the present specification.

FIG. 6 illustrates a method for zooming in on each region of a digital image by the display device according to an embodiment of the specification. As shown in FIG. 5, the display device 11 may display the digital image including the first region to which the first tactile feedback is allocated and the second region to which the second tactile feedback is allocated. Upon detection of control input from the first region, the display device 11 may compare the first region with the size threshold. When the first region is smaller than the size threshold, the display device 11 may zoom in on the first region to which the first tactile feedback is allocated to larger than the size threshold according to the first magnification. Here, the size threshold can be determined in response to the size of the touch region of the control input. That is, the display device 11 can increase the size threshold in proportion to the size of the touch region of the control input. The display device 11 can generate the first tactile feedback in the zoomed in first region. In this manner, the display device 11 can correctly provide tactile feedback allocated to each region included in the digital image to the user by zooming in on each region while maintaining the size of the digital image.

The left of FIG. 6 illustrates an operation of the display device when the display device detects a control input 64 for a digital image 61 from a first region. The digital image 61 may include a first region 62 to which a first tactile feedback is allocated and a second region 63 to which a second tactile feedback is allocated. The display device 11 may detect the control input 64 from the first region 62. The display device 11 may compare the first region 62 with the size threshold upon detection of the control input 64. If the first region 62 is smaller than the size threshold, the display device 11 may zoom in on the first region 62 to larger than the size threshold as shown in the left of FIG. 6.

Here, the display device 11 may zoom in on the first region 62 with the first magnification. The display device 11 may set the first magnification based on the size of the touch region of the control input 64 detected from the first region 62. That is, the display device 11 can increase the first magnification in proportion to the size of the touch region of the detected control input 64.

The display device 11 may generate the first tactile feedback in the zoomed in on first region 62. Accordingly, the user can tactually confirm the first tactile feedback through the zoomed in on first region 62.

The display device 11 may maintain the zoomed first region 62 during detection of the control input 64. The display device 11 may return the zoomed first region 62 to the original size thereof upon release of the control input 64.

The right of FIG. 6 illustrates an operation of the display device 11 when the display device 11 detects the control input 64 for the digital image 61 from the second region 63. The digital image 61 may include the first region 62 to which the first tactile feedback is allocated and the second region 63 to which the second tactile feedback is allocated. The display device 11 may detect the control input 64 from the second region 63. The display device 11 may compare the second region 63 with the size threshold upon detection of the control input 64. If the second region 62 is smaller than the size threshold, the display device 11 may zoom in on the second region 63 to a size larger than the size threshold as shown in the right of FIG. 6.

Here, the display device 11 may zoom in on the first region 62 with the second magnification. The display device 11 may set the second magnification based on the size of the touch region of the control input 64 detected from the second region 63. That is, the display device 11 can increase the second magnification in proportion to the size of the touch region of the detected control input 64.

The display device 11 may generate the second feedback in the zoomed in on second region 63. Accordingly, the user can tactually confirm the second tactile feedback through the zoomed second region 63.

The display device 11 may maintain the zoomed second region 63 during detection of the control input 64. The display device 11 may return the zoomed second region 63 to the original size thereof upon release of the control input 64.

Figure 7:
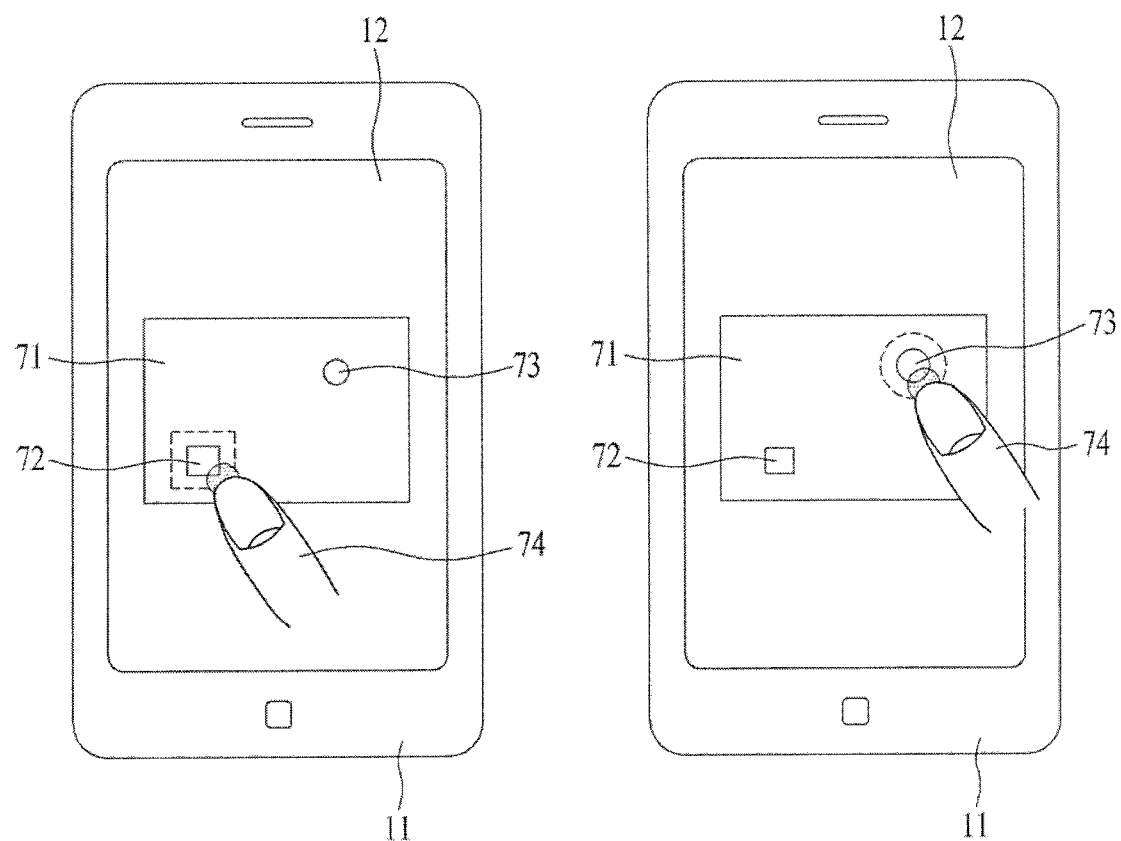
FIG. 7 illustrates a method for zooming in on a region in which tactile feedback is generated by the display device according to an embodiment of the present specification.

FIG. 7 illustrates a method for zooming in on a region in which tactile feedback is generated in the display device according to an embodiment of the specification. As shown in FIG. 5, the display device 11 may display the digital image including the first region to which the first tactile feedback is allocated and the second region to which the second tactile feedback is allocated. Upon detection of a control input from the first region, the display device 11 may compare the first region with the size threshold.

When the first region is smaller than the size threshold, the display device 11 may zoom in on a region in which the first tactile feedback allocated to the first region is generated to a size larger than the size threshold according to the first magnification. That is, the display device 11 can zoom in on the region in which the tactile feedback allocated to the first region is generated instead of the first region. Accordingly, the user can tactually confirm the first tactile feedback in a region wider than the first region while visually confirming the first region at the original size thereof.

At least one of the size threshold and the first magnification may be determined based on the size of the touch region of the control input. That is, the display device 11 may increase the size threshold in proportion to the size of the touch region of the control input. The display device 11 may generate the first tactile feedback in the zoomed in on region in which the first tactile feedback is generated. In this manner, the display device 11 can provide correct tactile feedback allocated to each region to the user by zooming in on a region in which tactile feedback allocated to each region is generated while maintaining the digital image and each region included therein at the original sizes thereof.

The left of FIG. 7 illustrates an operation of the display device 11 when the display device 11 detects a control input 74 for a digital image 71 from a first region. The digital image 71 may include a first region 72 to which a first tactile feedback is allocated and a second region 73 to which a second tactile feedback is allocated. The display device 11 may detect the control input 74 from the first region 72. The display device 11 may compare the first region 72 with the size threshold upon detection of the control input 74. If the first region 72 is smaller than the size threshold, the display device 11 may zoom in on a region in which the first tactile feedback allocated to the first region 72 is generated to a size larger than the size threshold as shown in the left of FIG. 7. The zoomed region is represented by a dotted line in the left of FIG. 7.

Here, the display device 11 may zoom in on the region in which the first tactile feedback allocated to the first region 72 is generated with the first magnification. The display device 11 may set the first magnification based on the size of the touch region of the control input 74 detected from the first region 72. That is, the display device 11 can increase the first magnification in proportion to the size of the touch region of the detected control input 74.

The display device 11 may generate the first tactile feedback in the zoomed first tactile feedback generation region. Accordingly, the user can tactually confirm the first tactile feedback through the zoomed first tactile feedback generation region.

The display device 11 may maintain the zoomed first tactile feedback generation region during detection of the control input 74. The display device 11 may return the zoomed first tactile feedback generation region to the original size thereof and generate the first tactile feedback in the first region 72 upon release of the control input 74.

The right of FIG. 7 illustrates operation of the display device 11 when the display device 11 detects the control input 74 for the digital image 71 from the second region 73. The digital image 71 may include the first region 72 to which the first tactile feedback is allocated and the second region 73 to which the second tactile feedback is allocated. The display device 11 may detect the control input 74 from the second region 73. The display device 11 may compare the second region 73 with the size threshold upon detection of the control input 74. If the second region 73 is smaller than the size threshold, the display device 11 may zoom in on a region in which the second tactile feedback allocated to the second region 73 is generated to a size larger than the size threshold as shown in the right of FIG. 7. The zoomed second tactile feedback generation region is represented by a dotted line in the right of FIG. 7.

Here, the display device 11 may zoom on in the region in which the second tactile feedback allocated to the second region is generated with the second magnification. The display device 11 can set the second magnification based on the size of the touch region of the control input 74 detected from the second region 73. That is, the display device 11 can increase the second magnification in proportion to the size of the touch region of the detected control input 74.

The display device 11 may generate the second tactile feedback in the zoomed second tactile feedback generation region . . . Accordingly, the user can tactually confirm the second tactile feedback through the zoomed second tactile feedback generation region.

The display device 11 may maintain the zoomed second tactile feedback generation region during detection of the control input 74. The display device 11 may return the zoomed second tactile feedback generation region to the original size thereof and generate the second tactile feedback in the second region 73 upon release of the control input 74.

Figure 8:
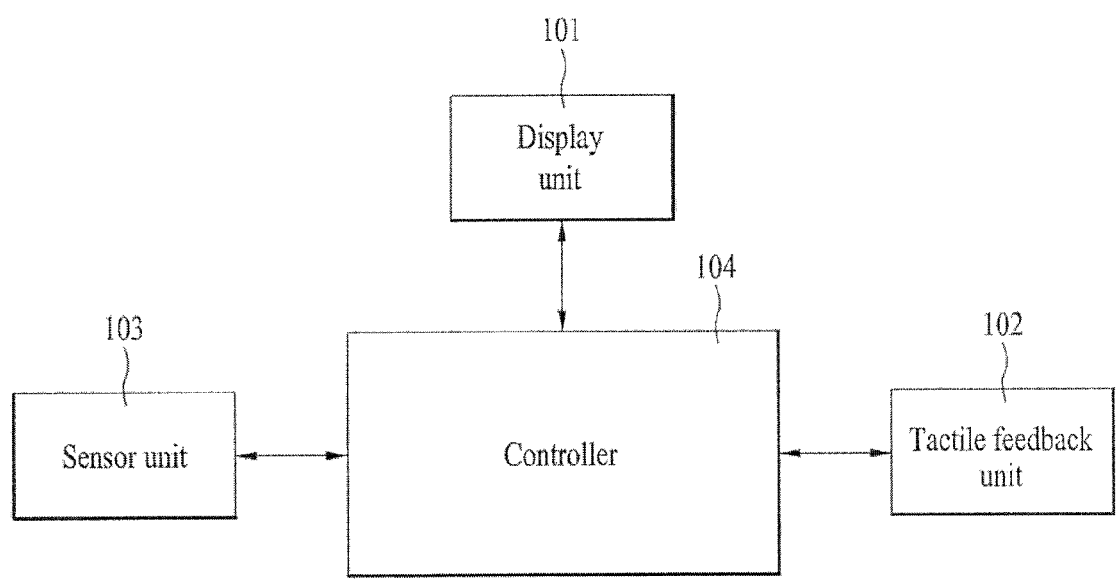
FIG. 8 is a block diagram of a display device according to an embodiment of the present specification.

FIG. 8 is a block diagram of a display device according to an embodiment of the specification. The display device may include a display unit 101, a tactile feedback unit 102, a sensor unit 103 and a controller 104.

The display unit 101 may display a digital image. The digital image may include a plurality of regions each of which is allocated a single tactile feedback.

The display unit 101 may include a light-emitting diode (LED), an organic LED (OLED), a liquid crystal display (LCD), an electronic ink panel or a flexible display. The display unit 101 may include a touch sensitive display unit and detect a control input touching the display unit. In addition, the display unit 101 may include a tactile display unit and provide tactile feedback of the tactile feedback unit, which will be described below.

The tactile feedback unit 102 may generate tactile feedback in response to a control input. The tactile feedback unit 102 may generate tactile feedback in a region to which tactile feedback is allocated in a digital image. The tactile feedback unit 102 may generate tactile feedback in a region corresponding to visual information of each region of the digital image. In addition, the tactile feedback unit 102 may set a region wider than each region of the digital image as tactile feedback generation region and generate tactile feedback.

The tactile feedback unit 102 generates tactile feedback and provides the tactile feedback to a user through the following method. The tactile feedback unit 102 may deliver tactile feedback to a user finger using a micro-vibration actuator or an ultrasonic vibration actuator. The tactile feedback unit 102 can control an oscillation frequency and vibration amplitude so as to adjust the intensity of the tactile feedback delivered to the user finger.

According to another embodiment, the tactile feedback unit 102 may generate micro current to provide tactile feedback to the user. The tactile feedback unit 102 can control current intensity and current generation period such that the user can feel different forms of tactile feedback.

In addition, the tactile feedback unit 102 may generate tactile feedback using ultrasonic resonance. The tactile feedback unit 102 may generate a plurality of ultrasonic waves and resonate the ultrasonic waves in a user finger to supply tactile feedback to the user. The tactile feedback unit 102 can control the amplitude of the resonance frequency and resonance generation period to generate different tactile feedbacks. The above-described display unit 101 and the tactile feedback unit 102 may be integrated into a tactile display unit.

The sensor unit 103 may sense a control input applied to the display device. The sensor unit 103 may sense a control input touching the display unit 101. The sensor unit 103 may sense a control input of the user using a resistive or capacitive touch sensor. The sensor unit 103 may deliver information about the sensed control input to the controller 104. The display unit 101 and the sensor unit 103 may be integrated into a touch sensitive display unit.

The controller 104 may control the display unit 101 and the tactile feedback unit 102 using information transmitted from the sensor unit 103. The controller 104 may display a digital image including a first region on the display unit 101. The controller 104 may compare the first region with a size threshold upon detection of a control input applied to the first region. The controller 104 may zoom in on the first region to a size larger than the size threshold when the first region is smaller than the size threshold. The controller 104 may zoom in on the first region with a first magnification. The first magnification may be determined based on the size of the touch region of the control input.

The controller 104 may zoom in on the first region through the following three methods. Firstly, the controller 104 can zoom in on the first region by zooming in on the digital mage. Accordingly, the controller 104 can also zoom in on other regions included in the digital image including the first region. Therefore, the user can be correctly provided with not only tactile feedback of the zoomed first region but also tactile feedbacks of the zoomed other regions.

Secondly, the controller 104 can partially zoom on in the first region. In this case, the controller 104 can selectively zoom in on only the first region while maintaining the region other than the first region in the digital image in the original size thereof. Accordingly, the user can confirm selective zoom-in of the first region selected through the control input visually and tactually.

Thirdly, the controller 104 may zoom in on a region in which the first tactile feedback allocated to the first region is generated. In this case, the controller 104 can zoom in on only the first tactile feedback generation region while maintaining each region of the digital image including the first region at the original size thereof. Accordingly, the user can tactually confirm the first tactile feedback in a region wider than the first region while visually confirming the digital image in the original size thereof.

In this manner, the controller 104 can zoom in on the first region through the three methods and thus the controller 104 can correctly provide the first tactile feedback allocated to the first region to the user.

In FIG. 8, blocks logically discriminate elements of the display device. Accordingly, the elements of the display device may be integrated into a single chip or multiple chips according to display device design.

FIG. 9 is a flowchart illustrating an operation of the display device according to an embodiment of the specification.

The display device may display a digital image including a first region to which a first tactile feedback is allocated (S10). As described above with reference to FIG. 1, the display device can display the digital image using the display unit. The digital image may include at least one region and each region included in the digital image may be allocated a single tactile feedback. That is, the display device may display a digital image including a first region to which a first tactile feedback is allocated and a second region to which a second tactile feedback is allocated.

The display device may detect a control input applied to the display unit from the first region (S20). As described above with reference to FIGS. 1, 2 and 3, the display device may detect the control input using the sensor unit. The display device may detect the position and size of the touch region of the control input. The display device may detect the control input from the first region and detect the contact size of the control input coming into contact with the display unit.

The display device may determine whether the first region is smaller than a size threshold (S30). As described above with reference to FIGS. 1 to 7, the display device may determine the size threshold in response to the size of the touch region of the control input. The display device may increase the size threshold in proportion to the size of the touch region of the control input. According to another embodiment, the display device may determine the size threshold on the basis of a value set in the display device manufacturing process or a value set by the user. Alternatively, the display device may set the average of areas of touch regions of a plurality of control inputs as the size threshold.

When the first region is smaller than the size threshold, the display device may zoom in on the first region to a size larger than the size threshold with the first magnification (S40). As described above with reference to FIGS. 2 to 7, the display device may zoom in on the first region by zooming in on the digital image. In this manner, the display device can also zoom in on other regions included in the digital image including the first region. Accordingly, the display device can provide not only the first tactile feedback of the zoomed first region but also tactile feedbacks of the zoomed other regions to the user.

Alternatively, the display device may selectively zoom in on the first region. The display device may selectively zoom in on the first region only while maintaining the region of the digital image other than the first region in the original size thereof. Accordingly, the display device can selectively zoom in on the first region selected by the control input and correctly provide the first tactile feedback to the user through the zoomed in on first region.

Alternatively, the display device may zoom in on a region in which the first tactile feedback allocated to the first region is generated. In this case, the display device can zoom in on only the first tactile feedback generation region while maintaining each region of the digital image including the first region at the original size thereof. Accordingly, the display device can correctly provide the first tactile feedback in a region zoomed in on compared to the first region to the user while displaying the digital image at the original size thereof.

The display device may determine a minimum magnification that allows the zoomed in on first region to include the touch region of the control input as the first magnification.

The display device may generate the first tactile feedback in the zoomed in on first region (S50). As described above with reference to FIGS. 1 to 7, the display device may generate the first tactile feedback in the zoomed in on first region using the tactile feedback unit. The display device may provide the correct first tactile feedback to the user by zooming in on the first tactile feedback generation region. As described above with reference to FIG. 8, the display device may provide the first tactile feedback using an ultrasonic vibration actuator, micro-current or ultrasonic resonance.

As described above, the display device can provide correct tactile feedback to the user by zooming in on a region smaller than the size threshold and generating tactile feedback in the zoomed in on region.

What is claimed is:

1. A display device generating tactile feedback, comprising:
    a display unit configured to display a digital image, the digital image including a first region;
    a sensor unit configured to detect a control input applied to the display unit;
    a tactile feedback unit configured to generate a feedback; and
    a controller configured to control the display unit, the sensor unit and the tactile feedback unit, wherein the controller further configured to:
    in response to a user's touch input in the first region,
    zoom in on the first region with a first magnification and with generating a first tactile feedback in the zoomed first region if a size of the first region is smaller than a size threshold, and
    generate the first tactile feedback in the first region without zooming in on the first region if the size of the first region is larger than the size threshold,
    wherein the control input is a touch input touching the digital image and the size threshold is determined on the basis of a touch region in which the touch input is detected,
    wherein the control input activates a tactile mode of the display device and the size threshold corresponds to a predetermined reference area, and
    wherein the predetermined reference area is determined as an average of touch areas of a user.

2. The display device according to claim 1, wherein, when the touch input is applied to the first region to which the first tactile feedback is allocated, the size threshold corresponds to the size of the touch region and the first magnification corresponds to a magnification at which the first region is zoomed in such that the touch region is included in the first region.

3. The display device according to claim 1, wherein, when the touch input is applied to the first region to which the first tactile feedback is allocated, the size threshold corresponds to the size of the touch region and the first magnification corresponds to a magnification by which the digital image is zoomed in such that the touch region is included in the first region.

4. The display device according to claim 1, wherein the average of the touch areas is determined based on a plurality of touch inputs for digital images including tactile feedback.

5. The display device according to claim 1, wherein, when the digital image further includes a second region to which a second tactile feedback is allocated, the first magnification is a maximum magnification that allows the first region and the second region to which the first tactile feedback and the second tactile feedback are respectively allocated to be displayed in a display area of the display unit.

6. The display device according to claim 1, wherein, when the digital image further includes a second region to which a second tactile feedback is allocated, the controller zooms in on one of the first region and the second region to a size larger than the size threshold.

7. The display device according to claim 6, wherein the controller zooms in on a smaller one of the first region and the second region with a second magnification.

8. The display device according to claim 6, wherein the controller zooms in on a larger one of the first region and the second region with a second magnification.

9. The display device according to claim 1, wherein the display device is a smartphone, a smart pad, a music player, a smart table, a monitor, a television receiver, a remote controller or a tablet computer.

10. The display device according to claim 1, wherein the display unit includes a liquid crystal display (LCD), a light-emitting diode (LED), an organic LED (OLED), or an electronic ink panel.

11. The display device according to claim 1, wherein the tactile feedback unit outputs the first tactile feedback using ultrasonic vibration and controls the first tactile feedback by changing at least one of the frequency and amplitude of the ultrasonic vibration.

12. The display device according to claim 1, wherein the tactile feedback unit generates micro-current in the first region to generate the first tactile feedback and controls the first tactile feedback by changing at least one of the intensity and generation period of the micro-current.

13. A method for controlling a display device generating tactile feedback, the method comprising:
    displaying a digital image including a first region;
    detecting a control input applied to the display unit;
    in response to user's touch input in the first region, zooming in on the first region with generating a first tactile feedback in the zoomed first region if a size of the first region is smaller than a size threshold, and
    generating the first tactile feedback in the first region without zooming in if the size of the first region is larger than the size threshold,
    wherein the control input is a touch input touching the digital image and the size threshold is determined on the basis of a touch region in which the touch input is detected,
    wherein the control input activates a tactile mode of the display device and the size threshold corresponds to a predetermined reference area, and
    wherein the predetermined reference area is determined as an average of touch areas of a user.

* * * * *